MALCOLM C. TATE
INVENTOR.

BY Blair and Buckles
ATTORNEY

Aug. 30, 1966     M. C. TATE     3,269,473
WEIGHING APPARATUS
Filed Dec. 30, 1963     4 Sheets-Sheet 2

MALCOLM C. TATE
*INVENTOR.*

BY   *Blair and Buckles*
ATTORNEY

MALCOLM C. TATE
INVENTOR.

BY Blair and Buckles
ATTORNEY

Aug. 30, 1966    M. C. TATE    3,269,473
WEIGHING APPARATUS
Filed Dec. 30, 1963    4 Sheets-Sheet 4

MALCOLM C. TATE
INVENTOR.

BY Blair and Buckles
ATTORNEY

United States Patent Office 3,269,473
Patented August 30, 1966

3,269,473
WEIGHING APPARATUS
Malcolm C. Tate, Stamford, Conn., assignor to A. H.
Emery Company, New Canaan, Conn.
Filed Dec. 30, 1963, Ser. No. 334,233
24 Claims. (Cl. 177—208)

This invention relates to weighing apparatus and more particularly to such apparatus for weighing relatively large loads.

It is desirable in weighing apparatus to have a high degree of sensitivity and accuracy over a wide load range. Whereas weighing apparatus having a relatively accurate loading response over a wide load range have been developed, the overall or net accuracy of these apparatus has been limited by the accuracy of the mechanism employed to translate the response of the apparatus to a readable indication of the actual weight of the load. Thus, for example, the dial and pointer arrangement customarily employed to visually display the apparatus response as an actual numerical weight is severely limited by the size of the dial and the accuracy with which the location of the tip of the pointer relative to the dial graduations can be visually ascertained.

In an attempt to solve this problem, the dials have been increased in physical dimensions to increase the circumferential length of the scale and thereby increase the accuracy with which the scale can be read. Such larger dials, however, are expensive to manufacture and, perhaps more importantly, they considerably increase the overall size of the weighing apparatus and make it extremely cumbersome.

An attempt has also been made to solve this problem by arranging the indicating mechanism so that the pointer makes a plurality of complete revolutions in response to receipt of a full capacity load, whereby the effective scale length is increased as the multiple of the number of such revolutions. Such an arrangement, however, is undesirable in that it places upon the operator the burden of remembering which revolution the pointer is in at any given instant and thereafter multiplying the number of complete revolutions undergone by the scale capacity per revolution, and adding to that product the actual reading of the pointer.

It is also desirable in weighing apparatus to provide means whereby a predetermined program of operations relating to the weighing operation being performed may be selectively pre-set by the operator. Such programming means is not available in known weighing apparatus, or if available, is unsatisfactory because of its complexity, difficulty of operation, inaccuracy and/or lack of versatility.

Accordingly, it is an object of the present invention to provide an improved weighing apparatus.

It is a more specific object to provide a weighing apparatus having a high degree of accuracy over a wide load range.

It is a yet more specific object to provide an indicator mechanism for use in a weighing apparatus which will accurately display the magnitude of loads varying in magnitude over a wide range.

It is a further object to provide a weighing apparatus having improved means whereby a predetermined program of operations relating to the weighing operation being performed may be selectively pre-set by the operator.

It is a more specific object to provide, in a weighing apparatus having programming means as aforesaid, means for simulating a load on the apparatus, whereby to check the accuracy of the programming prior to the commencement of the weighing operations for which the program has been selected.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which.

Figure 1:
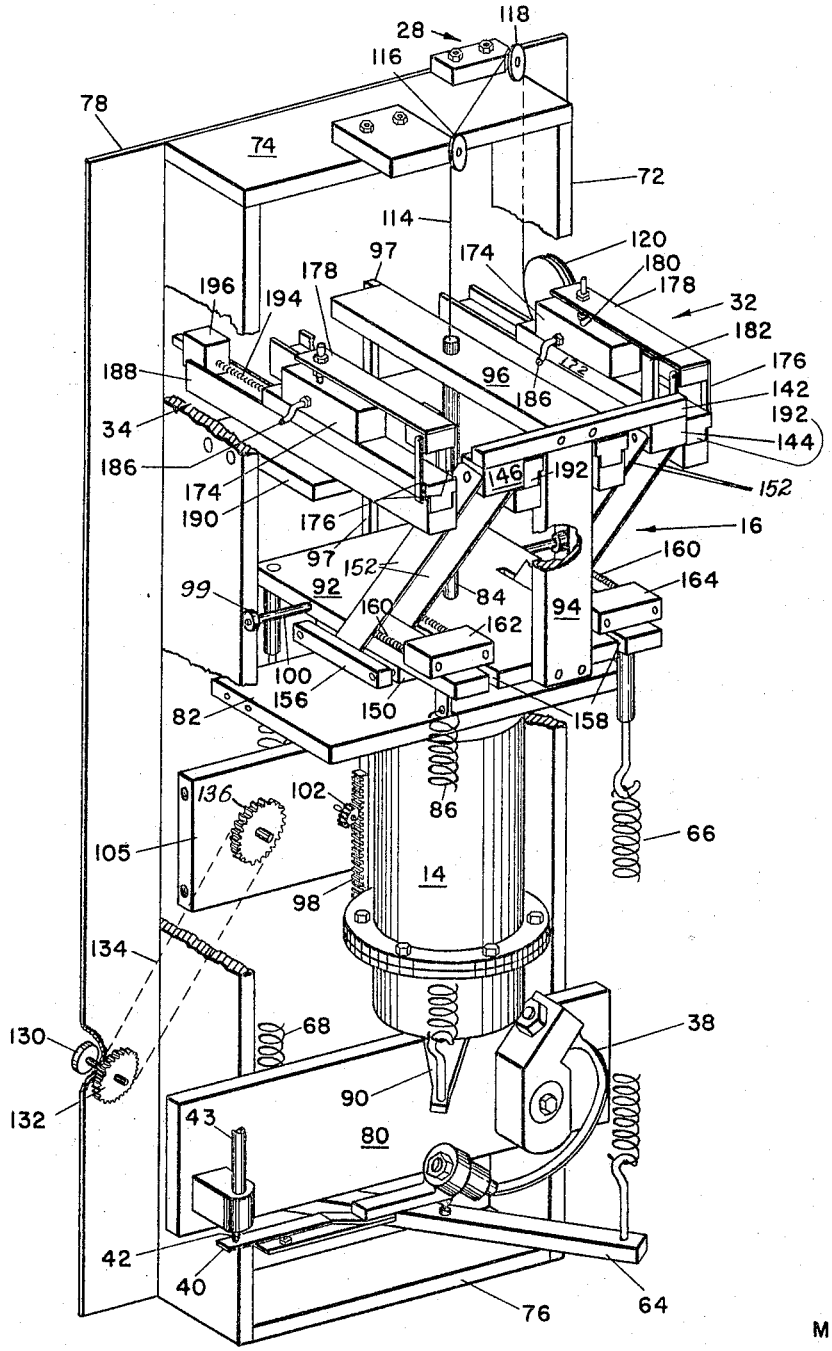
FIGURE 1 is a rear isometric view of a weighing apparatus embodying features of the present invention.

The weighing apparatus of the invention, broadly considered, comprises a load receiving surface 10, provided for example by the load receiving face of a hydraulic load cell 12, a motor 14, an assembly, generally indicated at 16, driven by the motor 14, and means, indicated generally at 18, which are operative in response to placement of a load on the surface 10 to actuate the motor 14 in a direction and to an extent to drive the assembly 16 through a distance proportional to the magnitude of the load on the surface 10. The assembly 16 drives by suitable means a load indicating pointer 20 which coacts with a fixed scale 22 to visually display the magnitude of the load.

According to one feature of the invention, the drive means between the assembly 16 and the pointer 20 are selected so as to rotate the pointer through a plurality of complete revolutions in response to receipt of a full capacity load and separate masking and number dials, 21 and 24 respectively, are provided. The masking dial is provided with a series of windows 26 arranged about the axis of the pointer and the number dial is mounted behind the masking dial for rotation about the pointer axis. Drive means, indicated generally at 28, are provided to continually rotate the number dial, during rotation of the pointer, at an angular speed which is proportional to and a fraction of the angular speed of the pointer, and the number dial is provided with a plurality of separate numerically ascending series of numbers corresponding in number to the number of revolutions of the pointer under full capacity load.

The arrangement of the number series on the number dial and the relative angular speeds of the number dial and pointer are selected so that during one revolution of the pointer the successive numbers of one of the number series are successively displayed through successive windows in the masking dial upon arrival of the pointer at each window, and upon each successive revolution of the pointer the numbers of a successive number series are similarly displayed. The effective length of the scale 22 is thus multiplied by the number of revolutions of the pointer under fully capacity load, so that an accurate indication of the load magnitude is provided over a wide load range, and the load weight corresponding to the position of the pointer is numerically displayed to the operator for any position of the pointer in any of its several revolutions.

Figure 2:
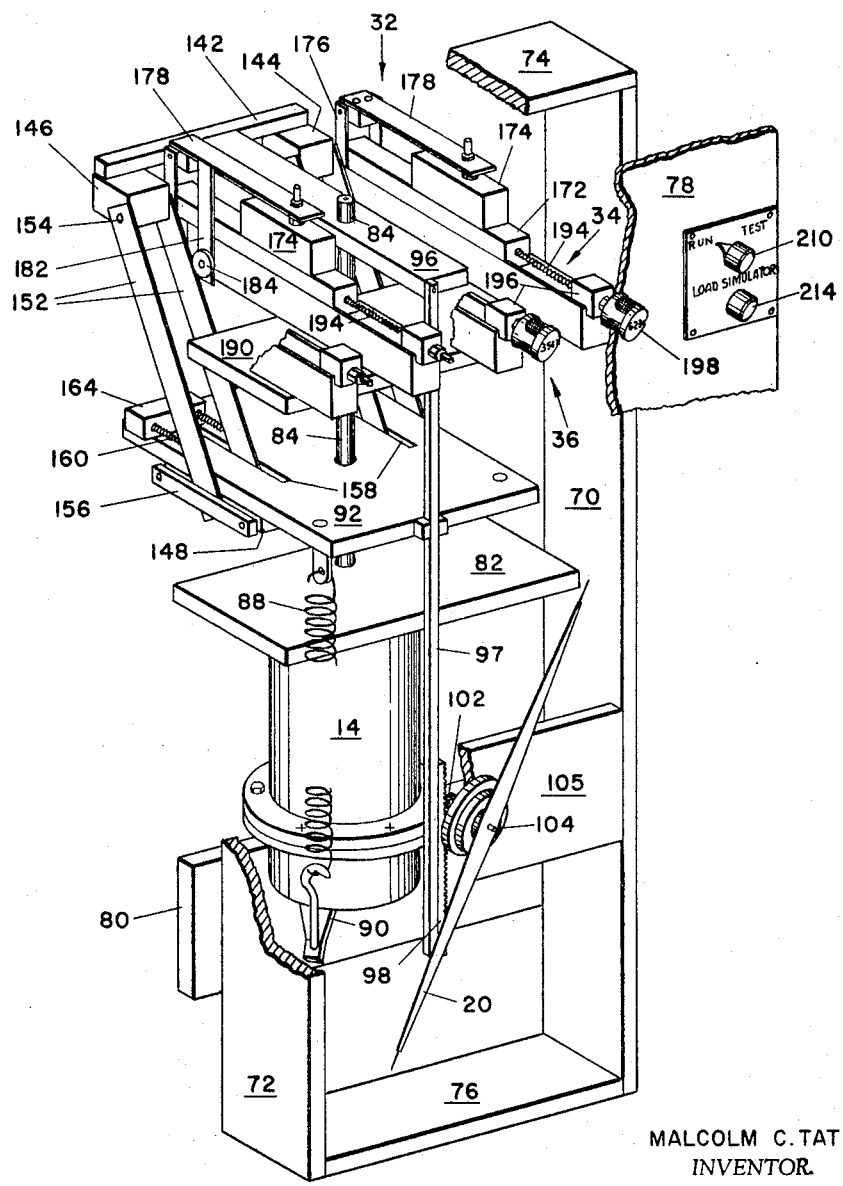
FIGURE 2 is a front isometric view of the weighing apparatus of FIGURE 1.
Figure 5:
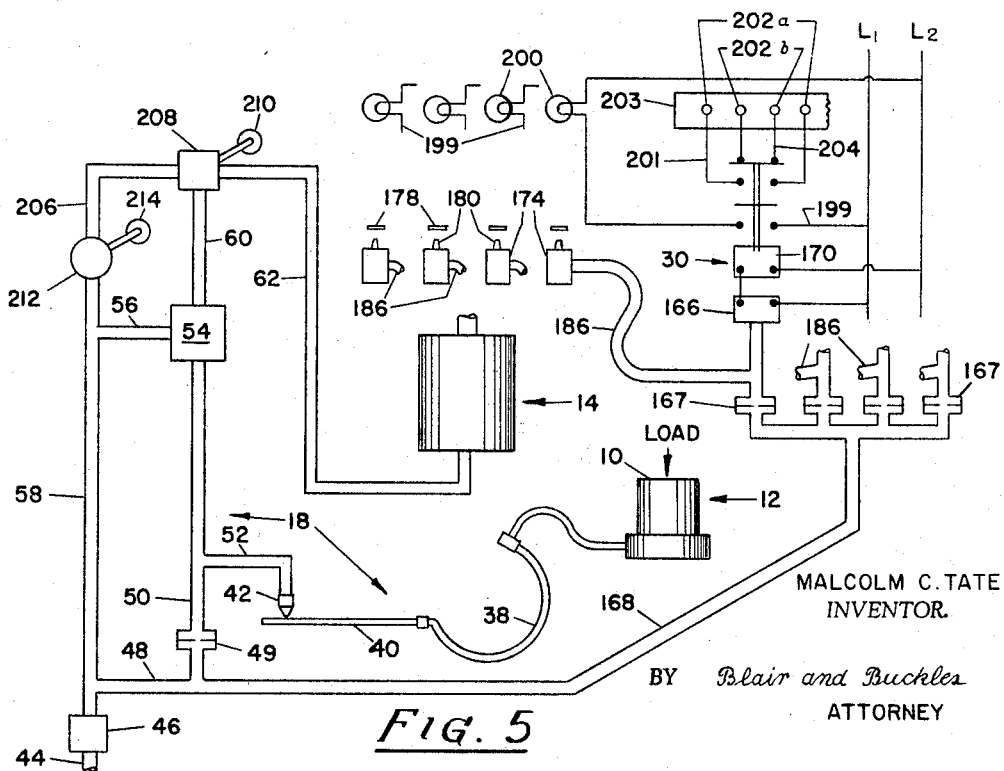
FIGURE 5 is a diagrammatic view of the apparatus showing fluid and electrical circuitry for use therewith.

According to a further feature of the invention, a control device indicated generally at 30 in FIG. 5 is provided and is operable when actuated to generate a control signal. Means, indicated generally at 32, in FIGS. 1 and 2, are provided which are operative in response to movement of the assembly 16 through a predetermined distance to actuate the control device 30, and adjusting means indicated generally at 34, are provided for selectively varying the extent of assembly travel required to actuate the control device 30 and thereby vary the angular position of the pointer 20 at which that device 30 is actuated. Means, indicated generally at 36, are provided to visually indicate, for any position of adjustment of the adjusting means 34, the angular position of the pointer and thereby the load magnitude at which that control device will be actuated to generate its control signal. By the provision of a plurality of such control devices, each with its own actuating, adjusting, and indicating means, the operator may collectively set the various control devices according to a particular loading program so that during a loading operation they will generate a plurality of control signals at a plurality of distinct and predetermined load magnitudes.

The means 18 for actuating the motor 14 in response to the load on the surface 10 includes a Bourdon tube 38 connected at one end to the output of the load cell 12; a baffle 40 secured to the other or free end of the Bourdon tube; a nozzle 42 opening adjacent the upper face of the baffle and continually supplied with air under pressure through a conduit 44, pressure regulator 46, conduit 48, orifice 49, and conduits 50 and 52; a reversing and amplifying air relay valve 54 connected to the nozzle 42 through conduits 50 and 52 and to regulator 46 by the conduits 56 and 58; conduits 60 and 62 connecting the valve 54 to the motor 14; a cross piece or yoke 64 underlying and bearing at its approximate midpoint against the free end of the Bourdon tube 38; and force balance springs 66 and 68 secured at their one ends to the opposite ends of the yoke 64 and at their other ends to spaced locations on the assembly 16.

In the disclosed embodiment, the various elements of the weighing apparatus are mounted either directly or indirectly on a cabinet frame including vertical side plates 70 and 72, horizontal top and bottom plates 74 and 76 and a face plate 78. The Bourdon tube 38 and nozzle 42 are mounted at spaced locations on a vertically disposed cross plate 80 spanning the vertical plates 70 and 72 adjacent their lower ends, and the motor 14, which preferably is in the form of a fluid pressure cylinder of the rolling diaphragm type, is secured at its top face to a horizontally disposed cross plate 82 butted between the plates 70 and 72 on a location on the latter substantially midway of their height.

Increase of internal pressure in Bourdon tube 38 due to increase of the load on the cell 12 causes expansion of the tube and accordingly moves baffle 40 downwardly away from nozzle 42. Such movement of baffle 40 reduces the pressure in conduit 52. The relay 54 senses this pressure drop and converts and amplifies it in known manner to a pressure increase in lines 60 and 62, thereby increasing the pressure in motor 14 and causing upward movement of the piston rod 84 of that motor.

The rod 84 is connected to and drives the assembly 16 so that the assembly is moved upwardly to extend the springs 66 and 68 and thereby increase the upward force exerted on the free end of the Bourdon tube through the yoke 64. The free end of the tube is thus moved upwardly so that the baffle 40 again restricts the flow of air from the nozzle 42 to raise the air pressure in the conduit 52. The baffle 40 is not restored to precisely its initial position but to a position where the pressure in conduit 52 will not be further reduced and hence a balanced relation is obtained at the free end of the Bourdon tube between the upward force exerted by the springs 66 and 68 and the downward force of the fluid pressure acting in the Bourdon tube. During this balancing operation, the piston rod 84 and the assembly 16 driven thereby undergo a relatively large increment of movement compared to the relatively minute increment of movement undergone by the free end of the Bourdon tube, this being accomplished by reason of the elasticity of the springs 66 and 68. The motor 14 is preferably maintained, under no load conditions, in a live condition, i.e., a condition in which the piston is precariously balanced by the air pressure acting on its lower face and the spring pressure acting on its upper face through the piston rod, so that it will quickly respond even to slight changes in the load magnitude. The springs 66 and 68 are chosen to have a substantially straight line stress-strain relation so that the movement undergone by the piston rod 84 and assembly 16 for any increase of the load on the cell 12 is proportional to the magnitude of that load increase. It will be understood that a decrease of the load on cell 12 will produce an action the reverse of that described above, the Bourdon tube contracting to move the baffle 40 upwardly to raise the pressure in conduit 52 and, through the action of relay 54, correspondingly decrease the pressure in the motor 14 to allow the piston rod 84 and assembly 16 to be lowered under the action of motor return springs 86 and 88, whereby to reduce the tension of the springs 66 and 68 and the force exerted by the latter on the free end of the Bourdon tube.

The motor return springs 86 and 88 are secured at their respective lower ends to the opposite ends of a cross piece 90 disposed below and supported by the motor 14 and at their respective upper ends are secured to diagonally opposite corners of a plate 92 forming a part of the assembly 16. The force balance springs 66 and 68 are secured to the other diagonally opposite corners of plate 92.

The assembly 16 further includes a post 94 extending upwardly from the rear edge of the plate 92, a bar 96 secured to the upper end of post 94 and extending forwardly from the latter, and a rod 97 depending from the forward end of the bar 96 and carrying at its lower end a rack 98. The piston rod 84 passes slidably through the cross plate 82 and passes through and is secured to the plate 92 and the bar 96. Rollers 99 carried on shafts 100 extending from opposite sides of the plate member 92 rollably engage the rear edge faces of the cabinet plates 70 and 72 to guide and prevent twisting of the assembly 16 as it is moved upwardly or downwardly in response to actuation of motor 14.

A pinion gear 102 is provided for coaction with the rack 98. The pinion 102 is secured to one end of a pin shaft 104 rotatably mounted in a brace plate 105 secured to the rear of face plate 78. The shaft 104 passes through brace plate 105 and face plate 78 for connection at its other end to pointer 20 which is thus rotatably driven upon actuation of motor 14, with the various drive ratios and part dimensions being selected so that pointer 20 is driven through a plurality of revolutions in response to placement of a full capacity load on the load cell 12.

The scale 22 for coaction with pointer 20 is circularly arranged on the face plate 78 concentric with the axis of shaft 104.

The number dial 24 comprises a disc mounted for rotation about the axis of the shaft 104 and the masking dial 21 comprises a disc of the same approximate diameter as dial 24. Dial 21 is disposed in a position concentric with shaft 104 and forwardly of and thus overlying the dial 24. The series of windows 26 provided on the masking dial are spaced equally around the periphery of that dial. In the disclosed embodiment, the windows 26 are in the form of radially extending slots opening at the periphery of the dial.

The number dial 24, as previously indicated, is provided at its peripheral edge with a plurality of separate numerically ascending series of numbers with the number of such series being equal to the number of revolutions of pointer 20 under full capacity load. For example, and as shown, the pointer may be arranged to make five complete revolutions under full capacity load and the number dial 24 thus being provided with five separate number series.

The number dial is continuously rotated during rotation of the pointer at an angular speed which is proportional to and a fraction of the angular speed of the pointer. The number dial is driven in the disclosed embodiment by a cable and pulley system including a cable 114 secured at its one end to the upper end of the piston rod 84, idler pulleys 116 and 118 mounted on the upper cabinet plate 74 and over which the cable 114 is passed, a relatively large diameter pulley 120 rotatably mounted on the cabinet side plate 72 and to the peripheral surface of which the other end of the cable 114 is secured, a relatively small diameter pulley 121 coaxially secured to the pulley 120, a cable 122 secured at its one end to the peripheral surface of the pulley 121, a pin 124 secured to the rear face of number dial 24 and projected from that face rearwardly through an oversize aperture 125 in the face plate 78 for securement to the other end of the cable 122, and a spring 126 secured to the pin 124 to maintain the cables 114 and 122 in a continuously taut condition.

Figure 4:
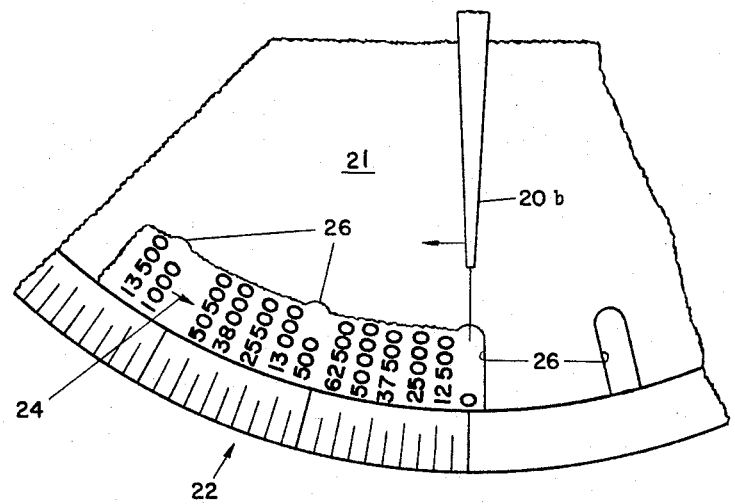
FIGURE 4 is a view on an enlarged scale of a portion of the apparatus as shown in FIG. 3.

The number series on the number dial are arranged so that a separate group of numbers is associated with and adjacent each window in the masking dial, with each group of numbers including one number from each of the number series arranged in descending order in the direction of rotation of the number dial. The numbers in the group associated with the first window, measured in the direction of rotation of the pointer from its rest position, comprise the lowest number in each of the number series and the groups adjacent each subsequent window are similarly constituted of a number from each of the number series corresponding in position in its series to the position of the window in its series. Thus, for example, where the pointer is designed to complete one revolution for each 12,500 lbs. of load and to undergo five complete revolutions under full capacity load, giving a full load capacity of 62,500 lbs., and where the windows 26 are 25 in number, the numbers will be arranged on the number dial as shown in FIG. 4, it being understood that peripheral portions of the number dial between successive windows have been broken off in that figure to show complete number groups.

Thus, associated with the first window is the number group 0—12500—25000—37500—50000—62500, with the second window the number group 500—13000—25500—38000—50500, etc. With the pointer in its rest or no load position, centered on the first window, the number 0 appears centered within that window. The number 500 appears slightly to the left of center in the second window, the number 1000 appears somewhat more to the left, and partially obscured, in the third window, etc. When a load is placed on the cell 12, the pointer commences to move clockwise and the number dial commences to move counter clockwise at an angular speed relative to that of the pointer such that by the time the pointer is centered on the second window the number 500 is centered in that window and by the time the pointer has reached the third window the number 1000 is centered in that window, the lowest number of each successive group centering itself in each successive window as the pointer continues around in its first revolution until, having completed that revolution and moving again into a position centered on the first window, the number dial has moved to center the lowest number of the second number series, i.e., 12500, in the first window. This counter and timed rotation of the number dial continues for as long as the pointer rotates so that when the pointer finally stops, whether in its first, second or some succeeding revolution, the number displayed in the window next adjacent the pointer represents the numerical magnitude of the load producing the cumulative angular displacement of the pointer so that the operator need not concern himself with keeping track of the number of revolutions which the pointer has at any instant undergone and thereafter calculating the actual weight.

A third dial 128 is mounted in front of the masking dial 22 for rotation about the axis of the pin shaft 104. Such rotation of the dial 128 is accomplished by turning a knob 130 on the lower right hand corner, as viewed in FIG. 3, of the face plate 78. Turning knob 130 rotates a sprocket 132 behind the face plate, the sprocket 132 driving a chain 134 which in turn drives a sprocket 136 rotatably mounted on brace plate 105 at a location thereon spaced from pin shaft 104. The sprocket 136 drives a pinion gear 138 engaging a gear 139 concentrically secured to the rear face of dial 128. A scale 140 is provided around the peripheral edge of dial 128 and numbers are provided on the scale ranging from 0 to the weight magnitude which the pointer registers in one revolution, in the disclosed embodiment, 12,500 lbs. Pointer 20 is rotatably mounted between its ends and provides a long end 20a for coaction with the outer scale 22 and a short end 20b for coaction with the scale 140.

Figure 3:
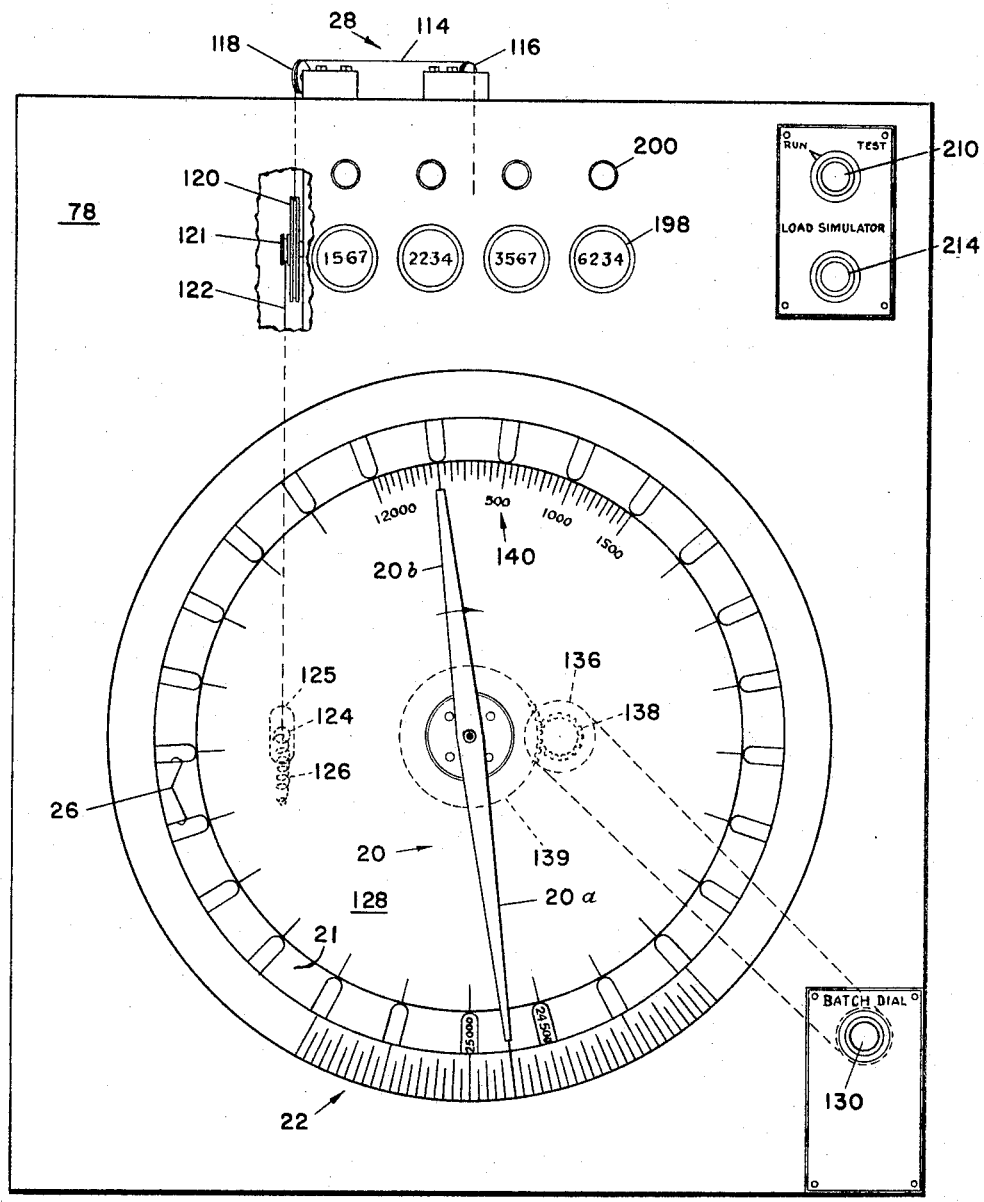
FIGURE 3 is a front elevational view of the apparatus.

The dial 128 may be termed a "batch" dial. It enables the scale operator to "batch" out or in a certain load quantity at any time without having to calculate the position of the pointer end 20a on the scale 22 at which the desired load quantity will have been achieved. That is, assume that a certain load, say 24,575 lbs., is already on the load cell. In response to this load, the pointer will have rotated through one complete revolution and the major part of a second. As seen in FIG. 3 the pointer end 20a will indicate on the scale 22, in coaction with the numbers on the number dial 110, the weight 24,575. If it is now desired to batch in an additional quantity, say 1097 lbs., the operator need not go through the difficult and distracting process of adding 1097 to 24,750 to find the position of the pointer end 20a on the scale 22 at which the batch will have been achieved, but rather need only rotate the dial 128 by the knob 130 until the 0 number on the scale 140 is brought into alignment, as seen in FIG. 3, with the pointer end 20b. The pointer end 20b will thereafter give a direct reading on the scale 140 of the load quantity which it is desired to batch in. Similarly, if it is desired to "batch out" a particular quantity, say again 1097 lbs., the operator need only rotate the dial 128 until the pointer end 20b is at 1097 on scale 140. When the pointer end 20b reaches 0 on scale 140, the operator will know that the desired quantity has been batched out.

The assembly 16 further includes a bar 142 secured to the upper end of the post 94 and extending transversely from both sides of that post. Blocks 144 and 146 are secured to the underside of the bar 142 adjacent its respective ends and blocks 148 and 150 are secured to the underside of the plate 92 adjacent its respective sides. Four cam plates 152 are pivotally secured, one to each side face of each block 144 and 146, as by screws 154. The cam plates 152 depend from the blocks 144 and 146 and are releasably clamped adjacent their lower ends against the opposite faces of the blocks 148 and 150 by clamping bars 156. The outer cam plates pass adjacent the respective opposite sides of the plate 92 and the inner cam plates pass through slots 158 in that plate. Screws 160 threaded into blocks 162 and 164 secured to the upper side of the plate 92 bear against the rear edge of each cam plate.

There are as many control devices 30 as there are cam plates in this case, four. Each control device 30, only one of which is shown, includes a pressure switch 166 of known form. Each switch 166 is supplied with air under pressure through an orifice 167 in a conduit 168 communicating with the conduit 48 and is operative in response to a drop in the air pressure in conduit 186 to close a circuit to a relay 170.

The means 32 for actuating each control device includes a block 172, a block 174 secured to the top surface of block 172, pedestals 176 upstanding from the rear of block 172, a baffle plate 178 pivotally mounted at its rear end between the pedestals 176 and overlying at its free end a nozzle 180 carried by the block 174, an actuator arm 182 secured at its upper end to baffle plate 178 intermediate the ends of the latter and a cam roller 184 rotatably mounted on the free lower end of arm 182 in the place of upward movement of a respective one of the cam plates 152.

A flexible conduit 186 communicates at one end with the conduit 168 and at its other end with a bore in block 174 which in turn communicates with nozzle 180. It will be seen that as assembly 16 is moved upwardly by motor 14 in response to imposition of a load on cell 12, each cam plate at a point in its upward movement determined by the forward-rearward position of cam roller 184, will engage the respective roller 184 to pivot the free end of the baffle plate upwardly away from the nozzle 180, whereby to drop the pressure in conduit 186 in the portion of conduit 168 above orifice 167 and thereby trip pressure switch 166 to actuate relay 170.

The adjusting means 34 for each control device comprises a ground track 188 supported on a cross plate 190 butted between the cabinet plates 70 and 72. Each track 188 slidably receives a tongue 192 provided on the lower portion of block 172, and a screw 194 is passed through a block 196 mounted in the face plate 78, and is threaded axially into block 172. By turning screw 194, the block 172 is moved axially along track 188 to vary the position of cam roller 184 relative to the related cam plate 152 and thereby vary the extent of upward travel of assembly 16 required to actuate the related control device 30. Since each block 172 may be adjusted independently of each other block, each control device may be pre-set to fire at a point in the upward travel of assembly 16 entirely independent of the setting of each other control device.

The indicating means 36 for each control device comprises a digital counter 198 secured to the free end of screw 194. The counter 198 is actuated by turning of the screw and displays a number at all times proportional to the number of turns undergone by the screw. This counter may take varying forms, one such form, and the form shown, comprising a series 1300 Borg Micro Dial available from Amphenol-Borg Electronic Corp. of Broadview, Illinois. This counter includes a series of side by side number discs each carrying numbers from 0–9 and each turned in response to rotation of screw 194 at a speed which is $\frac{1}{10}$ that of the next adjacent disc on its one side and 10 times that of the next adjacent disc on its other side, the counter thus operating much in the manner of a motor vehicle odometer. The pitch of screw 194 and the slope of cam plates 152 are selected so that the number displayed on the counter for any position of the cam roller 184 corresponds to the weight measure which the pointer end 20a will indicate on scale 22 at such time as cam roller 184 is engaged and displaced to actuate the related control device. That is, the control device will fire at such time as the load imposed on the load cell reaches the numerical magnitude displayed by the digital counter 198.

The operator may thus pre-set the various control devices according to any desired program of operations to be performed in relation to the contemplated weighing operation. The program which may thus be set up is essentially limitless. Further, once a particular program is set up, it will be automatically and precisely repeated for each successive weighing operation. It is to be understood that numerical correspondence between the numbers on the counter and the number indicated by the pointer is initially achieved by loosening the clamping bars 156 and thereafter adjusting the slope of the cam plates by selectively turning screws 160 until the required numerical correspondence is achieved. The cam plates are thereafter clamped in position by tightening of clamping bars 156 and need not again be adjusted during the course of normal operation.

The relay 170 may take any of varying forms depending upon the nature and number of control signals which it is desired to generate upon actuation of the control device. In the form shown, relay 170 has an armature carrying two switch arms with one switch arm arranged to close a circuit 199 to a light 200 mounted in the face plate 78 directly above the related counter 198, whereby to call the operator's attention to the firing of the control device, and with the other switch arm arranged, with the relay energized, to close a circuit 201 to a first set 202a of terminals on a suitable terminal board 203 and, with the relay de-energized, to close a circuit 204 to a second set 202b of terminals on board 203. The user of the weighing apparatus is thus enabled to connect to the terminal set 202 associated with each control device an electrical control apparatus of his own choosing and suiting his own peculiar weighing program requirements. Further, each such control apparatus may be arranged to be normally energized or normally de-energized, depending upon whether the normally open terminals 202a or the normally closed terminals 202b are employed.

In order to enable the operator to assure himself that the various control devices will in fact fire during the weighing operation at the load magnitudes indicated by the various counters 198, means are provided to simulate a load on the apparatus. These means include a conduit 206 communicating at one end with conduit 56 and at its other end with one port of a valve 208, two other ports of which are connected to the conduits 60 and 62 respectively. The valve 208 is moved by a knob 210 on the face plate 78 between a run position in which conduits 60 and 62 communicate through valve 208 and a test position in which conduits 206 and 62 communicate and communication between conduits 60 and 62 is blocked. Normally the valve 208 will be its run position. When, however, it is desired to simulate a load to check the control device settings, the operator need only move the valve 208 to its test position to supply air to the motor through conduits 206 and 62 and run the motor and assembly 16 through their full stroke to fire the control devices. In order to control the extent of movement of the motor and assembly when simulating a load, a pressure regulator 212 is provided in line 206, the regulator being adjustable by turning of a knob 214 on the face plate.

The weighing apparatus of the invention will be seen to provide several important advantages. Because of the long effective scale length, the scale may be accurately read, and because of the timed positioning of the numbers relative to the pointer the operator is relieved of the burden of keeping track of the revolutions undergone by the counter and thereafter multiplying the number of complete revolutions by the scale capacity per revolution and adding to that product the actual reading of the pointer. Further, by use of the plurality of control devices provided, the operator is enabled to pre-set the apparatus according to a precise program so that it will automatically initiate a plurality of operations relating to the weighing operation being performed. Each control device is adjustable over the full range of the weighing apparatus and independently of each other control device. Since motor 14 rather than the Bourdon tube provides the power to rotate the pointer and number dial as well as to actuate the control devices, and since motor 14 has enough power to easily perform all of these functions, the settings of the control devices have no effect on the accuracy of the scale readings.

Further, although the use of a force balance system in a weighing apparatus is generally old, it has been found that the particular force balance system disclosed herein gives results superior to that obtained with the known apparatus of this type. It has been found for example, that a weighing apparatus embodying the particular force balance system disclosed has an overall accuracy of response of 0.05% of capacity, this being so despite the fact that the Bourdon tube employed is generally accurate only to 0.05% of capacity. This accuracy of response, coupled with the high readability provided by the long effective scale length, enable the apparatus of the invention to be used to determine load magnitudes with extremely high accuracy over a large load range. It has further been found that in a weighing apparatus constructed according to the invention the control devices are accurate to 1/6000. Thus, for example, with a scale having as disclosed a capacity of 62,500 lbs. the control device will consistently fire within 10 lbs. of the numerical magnitude displayed by its counter.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

Having described my invention, what I claim as new and desire to secure by Letters Patent is:

1. A weighing apparatus capable of indicating the magnitude of loads up to a predetermined maximum magnitude comprising
   A. a load receiving surface,
   B. a rotatable load indicating pointer,
   C. means operative in response to receipt of a load on said surface to rotate said pointer through an angle proportional to the magnitude of said load, said means being operative to move said pointer through a plurality of complete revolutions upon receipt of a load of said maximum magnitude on said surface,
   D. a masking dial having a series of windows arranged about the axis of rotation of said pointer,
   E. a number dial mounted behind said masking dial, one of said dials being mounted for rotation about said pointer axis,
   F. and means operative to continuously rotate said one dial during rotation of said pointer at an angular speed which is proportional to and a fraction of the angular speed of said pointer,
   G. said number dial having a plurality of separate numerically ascending series of numbers thereon corresponding in number to the number of revolutions of said pointer under said maximum load and the arrangement of said number series on said number dial and the relative angular speeds of said one dial and said pointer being selected so that during one revolution of said pointer the successive numbers of one of said number series are successively displayed through successive ones of said windows upon arrival of said pointer at each of said windows and upon each successive revolution of said pointer the numbers of a successive number series are similarly successively displayed.

2. A weighing apparatus capable of indicating the magnitude of loads up to a predetermined maximum magnitude comprising
   A. a load receiving surface,
   B. a rotatable load indicating pointer,
   C. means operative in response to receipt of a load on said surface to rotate said pointer through an angle proportional to the magnitude of said load, said means being operative to move said pointer through a plurality of complete revolutions upon receipt of a load of said maximum magnitude on said surface,
   D. a first scale arranged about the axis of rotation of said pointer for coaction with the latter to indicate the magnitude of a load,
   E. a masking dial having a series of windows arranged about said pointer axis,
   F. and means operative to continuously rotate said number dial during rotation of said pointer at an angular speed which is proportional to and a fraction of the angular speed of said pointer,
   G. said number dial having a plurality of separate numerically ascending series of numbers thereon corresponding in number to the number of revolutions of said pointer under said maximum load and the arrangement of said number series on said number dial and the relative angular speeds of said number dial and said pointer being selected so that during one revolution of said pointer the successive numbers of one of said number series are successively displayed through successive ones of said windows upon arrival of said pointer at each of said windows and upon each successive revolution of said pointer the numbers of a successive number series are similarly successively displayed.

3. The weighing apparatus of claim 2
   A. a separate group of said numbers being provided on said number dial adjacent each window, each said group including one number from each of said number series arranged in descending order in the direction of rotation of said number dial,
   B. the numbers in the group adjacent the first window, measured in the direction of rotation of the pointer from rest position, comprising the lowest number in each of said number series and the groups adjacent each subsequent window being similarly constituted of a number from each of said number series corresponding in position in said number series to the position of said window in its series.

4. A weighing apparatus according to claim 2, and further including
   A. a movable scale arranged about the axis of said pointer for coaction with the latter, and
   B. Means for selectively shifting said scale bodily about said axis.

5. A weighing apparatus according to claim 4, said pointer being rotatably mounted between its ends, one end of said pointer being arranged for coaction with said fixed scale and the other end for coaction with said movable scale.

6. A weighing apparatus comprising
   A. a load receiving surface,
   B. a member moved in response to variation of the load on said surface from a starting position through a distance proportional to the magnitude of said load variation,
   C. display means moved by, and in response to movement of, said member through a distance proportional to the distance through which said member is moved, whereby to display the magnitude of said load variation,
   D. A control device operable when actuated to generate a control signal,
   E. pneumatic pressure sensing means operative in response to movement of said member through a predetermined distance from said starting position to actuate said control device,
   F. adjusting means for selectively varying the magnitude of said predetermined distance, whereby to vary the position of said display means at which said signal is generated,
   G. and means visually indicating, for any position of adjustment of said adjusting means, the position of said display means, and thereby the load magnitude, at which said signal will be generated.

7. A weighing apparatus according to claim 6 wherein
   A. there are a plurality of such control devices and pneumatic pressure sensing means and adjusting means as aforesaid are provided for each control device,
   B. each such adjusting means being operable to independently vary the magnitude of said predetermined distance of member movement for actuation of its control device without varying such distance for any of the other devices, C. and wherein a separate visually indicating means as aforesaid is provided for each control device, whereby said control devices may be collectively set to generate a plurality of control signals at a plurality of distinct and predetermined load magnitudes.

8. A weighing apparatus according to claim 7 and further including

A. means for moving said member as aforesaid independently of the magnitude or presence of a load on said surface, whereby prior to an actual weighing operation said control devices may be set and the reading of said visually indicating means for each control device compared for accuracy with the position of said display means at which that device is actuated.

9. A weighing apparatus comprising

A. a load receiving surface
B. a member moved in response to receipt of a load on said surface from a rest position through a distance proportional to the magnitude of said load,
C. display means moved by and in response to movement of said member through a distance proportional to the distance through which said member is moved, whereby to display the magnitude of said load,
D. a pneumatic control device having a baffle with an arm disposed in a position to be engaged and pivotally displaced by a surface on said member upon such movement of the latter, the free end of said baffle moving through a greater distance than said member to pneumatically generate a control signal,
E. means for adjusting the distance of said arm, in the direction of said member movement, from the position assumed by said member surface with said member in its rest position, whereby to vary the extent of member movement required to engage and displace said arm and thereby vary the position of said display means at which said control signal is generated,
F. and means visually indicating for any position of adjustment of said arm relative to said surface the position of said display means, and thereby the load magnitude, at which said signal will be generated.

10. A weighing apparatus according to claim 9 wherein

A. there are a plurality of such member surfaces, and a corresponding plurality of such control devices, the arm of each control device being disposed in a position to be engaged and displaced as aforesaid by a respective one of said member surfaces and each arm being adjustable relative to its displacing member surface to vary its distance from that surface without varying the distance of any other of the arms from their actuating member surfaces,
B. and wherein separate visually indicating means as aforesaid are provided for each such control device so that said control devices may be set to collectively generate a plurality of control signals at a plurality of distinct and predetermined load magnitudes.

11. A weighing apparatus according to claim 9

A. said display means presenting a numerical measure of the magnitude of said load,
B. said control device including a part carrying said arm,
C. said adjusting means including
 (1) a threaded bore in said part
 (2) a track mounting said part for sliding movement and blocking rotation thereof, and
 (3) a screw threadable into said bore so as to act when turned to slide said part along said track to adjust the position of said arm relative to said surface,
D. said visually indicating means comprising a counter advanced by turning of said screw and displaying a number at all times proportional to the number of turns undergone by said screw,
E. the pitch of said screw and the drive ratios of said counter being selected so that the number displayed by said counter for any position of said arm corresponds to the numerical measure which said display means will present at such time as said arm is engaged and displaced by said member, so that said control signal will be generated when said numerical measure, and thereby said load, corresponds to the number setting of said counter.

12. A weighing apparatus capable of indicating the magnitude of loads up to a predetermined maximum magnitude comprising A. a load receiving surface,
B. a Bourdon tube,
C. means subjecting said tube to a pressure proportional to the magnitude of a load received on said surface whereby to move its free end away from a given position by an amount proportional to the magnitude of said load,
D. a resiliently extensible element connected at one end to the free end of said tube,
E. a member connected to the other end of said element,
F. means operative in response to movement of said free end away from its said given position to move said member in a direction and to an extent to restore said free end substantially to said given position, said resiliently extensible element having a substantially straight line stress-strain relation so that the restoring movement of said member is proportional to the magnitude of said load,
G. a load indicating pointer rotatably driven by movement of said member, the drive ratio between said member and said pointer being such as to cause said pointer to undergo a plurality of complete revolutions in response to the movement of said member resulting from receipt of a load of said maximum magnitude on said surface,
H. a scale arranged about the axis of rotation of said pointer for coaction with the latter to indicate the magnitude of a load,
I. a masking dial having a series of windows arranged about said pointer axis,
J. and a number dial mounted behind said masking dial and rotatably driven by said member about said pointer axis at an angular speed which is proportional to and a fraction of the angular speed of said pointer,
K. said number dial having a plurality of separate numerically ascending series of numbers thereon corresponding in number to the number of revolutions of said pointer under said maximum load and the arrangement of said number series on said number dial and the angular speed of said number dial relative to that of said pointer being selected so that during one revolution of said pointer the successive numbers of one of said series are successively displayed through successive ones of said windows upon arrival of said pointer at each said window and upon each successive revolution of said pointer the numbers of a successive number series are similarly successively displayed.

13. A weighing apparatus comprising

A. a load receiving surface
B. a Bourdon tube
C. means subjecting said tube to a pressure proportional to the magnitude of a load received on said surface, whereby to move its free end away from a given position by an amount proportional to the magnitude of said load, D. a resiliently extensible element connected at one end to the free end of said tube, E. a member connected to the other end of said element, F. means operative in response to movement of said free end away from its said given position to move said member from its rest position in a direction and to an extent to restore said free end substantially to said given position, said resiliently extensible element having a substantially straight line stress-strain relation so that the restoring movement of said member is proportional to the magnitude of said load, G. display means moved by, and in response to movement of, said member through a distance proportional to the distance through which said member is moved, whereby to display the magnitude of said load variation, H. a control device operable when actuated to generate a control signal, I. pneumatic pressure sensing means operative in response to movement of said member through a predetermined distance from said rest position to actuate said control device, J. adjusting means for selectively varying the magnitude of said predetermined distance, whereby to vary the position of said display means at which said signal is generated, K. and means visually indicating, for any position of adjustment of said adjusting means, the position of said display means, and thereby the load magnitude, at which said signal will be generated.

14. A weighing apparatus according to claim 12, said load receiving surface being presented by, and said subjecting means comprising, a hydraulic load cell.

15. A weighing apparatus according to claim 13, said load receiving surface being presented by, and said subjecting means comprising, a hydraulic load cell.

16. A weighing apparatus capable of indicating the magnitude of loads up to a predetermined maximum magnitude comprising A. a load receiving surface, B. a Bourdon tube, C. means subjecting said tube to a pressure proportional to the magnitude of a load received on said surface, whereby to move its free end away from a given position by an amount proportional to the magnitude of said load, D. a resiliently extensible element connected at one end to the free end of said tube, E. a member connected to the other end of said element, F. means operative in response to movement of said free end away from its said given position to move said member from its rest position in a direction and to an extent to restore said free end substantially to said given position, said resiliently extensible element having a substantially straight line stress-strain relation so that the restoring movement of said member is proportional to the magnitude of said load, G. a load indicating pointer rotatably driven by movement of said member, the drive ratio between said member and said pointer being such as to cause said pointer to undergo a plurality of complete revolutions in response to the movement of said member resulting from receipt of a load of said maximum magnitude on said surface, H. a scale arranged about the axis of rotation of said pointer for coaction with the latter to indicate the magitude of a load, I. a masking dial having a series of windows arranged about said pointer axis, J. a number dial mounted behind said masking dial and rotatably driven by said member about said pointer axis at an angular speed which is proportional to and a fraction of the angular speed of said pointer, K. said number dial having a plurality of separate numerically ascending series of numbers thereon corresponding in number to the number of revolutions of said pointer under said maximum load and the arrangement of said number series on said number dial and the angular speed of said number dial relative to that of said pointer being selected so that during one revolution of said pointer the successive numbers of one of said series are successively displayed through successive ones of said windows upon arrival of said pointer at each said window and upon each successive revolution of said pointer the numbers of a successive number series are similarly successively displayed, L. a control device operable when actuated to generate a control signal, M. means operative in response to movement of said member through a predetermined distance from said rest position to actuate said control device N. adjusting means for selectively varying the magnitude of said predetermined distance, whereby to vary the cumulative angular position of said pointer at which said signal is generated, O. and means visually indicating, for any position of adjustment of said adjustment means, the cumulative angular position of said pointer and thereby the load magnitude, at which said signal will be generated.

17. Weighing apparatus as defined in claim 6 wherein said display means is a rotatable pointer and there is provided H. first and second scales arranged about the axis of rotation of said pointer for coaction with the latter to indicate said magnitude;

I. said first and second scales being relatively rotatable about said axis so that the one may be used to indicate the total magnitude of the load on said surface and the other may be rotated relative to the one to independently indicate desired incremental changes in that load.

18. A weighing apparatus according to claim 17, said pointer means comprising a pointer rotatably mounted between its ends, one end thereof being arranged for coaction with said first scale and the other end for coaction with said second scale.

19. A weighing apparatus capable of indicating the magnitude of load signals up to a predetermined maximum magnitude comprising A. a rotatable load indicating pointer, B. means operative in response to receipt of a load signal to rotate said pointer through an angle proportional to the magnitude of said signal, said means being operative to move said pointer through a plurality of complete revolutions upon receipt of a signal of said maximum magnitude, C. a masking dial having a series of windows arranged about the axis of rotation of said pointer, D. a number dial mounted behind said masking dial, one of said dials being mounted for rotation about said pointer axis, E. and means operative to continuously rotate said one dial during rotation of said pointer at an angular speed which is proportional to and a fraction of the angular speed of said pointer, F. said number dial having a plurality of separate numerically ascending series of numbers thereon corresponding in number to the number of revolutions of said pointer under said maximum load and the arrangement of said number series on said number dial and the relative angular speeds of said one dial and said pointer being selected so that during one revolution of said pointer the successive numbers of one of said number series are successively displayed through successive ones of said windows upon arrival of said pointer at each of said windows and upon each successive revolution of said pointer the numbers of a successive number series are similarly successively displayed.

20. A weighing apparatus capable of indicating the magnitude of load signals up to a predetermined maximum magnitude comprising
   A. a rotatable load indicating pointer,
   B. means operative in response to receipt of a load signal to rotate said pointer through an angle proportional to the magnitude of said signal, said means being operative to move said pointer through a plurality of complete revolutions upon receipt of a signal of said maximum magnitude,
   C. a first scale arranged about the axis of rotation of said pointer for coaction with the latter to indicate the magnitude of a load signal,
   D. a masking dial having a series of windows arranged about said pointer axis,
   E. and means operative to continuously rotate said number dial during rotation of said pointer at an angular speed which is proportional to and a fraction of the angular speed of said pointer,
   F. said number dial having a plurality of separate numerically ascending series of numbers thereon corresponding in number to the number of revolutions of said pointer under said maximum load signal and the arrangement of said number series on said number dial and the relative angular speeds of said number dial and said pointer being selected so that during one revolution of said pointer the successive numbers of one of said number series are successively displayed through successive ones of said windows upon arrival of said pointer at each of said windows and upon each successive revolution of said pointer the numbers of a successive number series are similarly successively displayed.

21. The weighing apparatus of claim 20
   A. a separate group of said numbers being provided on said number dial adjacent each window, each said group including one number from each of said number series arranged in descending order in the direction of rotation of said number dial,
   B. the numbers in the group adjacent the first window, measured in the direction of rotation of the pointer from rest position, comprising the lowest number in each of said number series and the groups adjacent each subsequent window being similarly constituted of a number from each of said number series corresponding in position in said number series to the position of said window in its series.

22. In weighing apparatus the combination of:
   A. a force sensing system
      (1) having an assembly movable through a distance proportional to a load signal;
   B. a control device adapted to operate an external relay at a predetermined load and comprising
      (1) pneumatic pressure switch means
         (a) having a nozzle open to the atmosphere, and
      (2) a baffle plate
         (a) actuated by movement of said assembly, and
         (b) positioned to interact with said nozzle to vary the air pressure in said pneumatic switch means when said assembly reaches a predetermined point along its path of movement.

23. The combination defined in claim 22 wherein said baffle plate is pivoted for movement toward and away from said nozzle, and is provided with an arm for engaging a portion of said assembly at a predetermined point along said path of movement, said arm being spaced from the baffle pivot to provide amplification of baffle plate movement toward and away from said nozzle relative to the movement of said assembly.

24. The combination defined in claim 23 including adjusting means for varying the point of engagement of said baffle plate with respect to said assembly, whereby the point of baffle plate engagement may be positioned at a distance from said assembly representing a predetermined load signal, and movement of said baffle plate by said assembly actuates said control devices at a predetermined load magnitude.

References Cited by the Examiner

UNITED STATES PATENTS

| | | | |
|---|---|---|---|
| 1,072,390 | 9/1913 | McFarlane | 177—45 |
| 1,835,104 | 12/1931 | Watson | 177—70 |
| 2,357,272 | 8/1944 | Tate | 177—208 |
| 2,540,176 | 2/1951 | Saunders | 177—208 |
| 2,620,177 | 12/1952 | Wise | 177—208 |
| 2,634,082 | 4/1953 | Knobel | 177—116 |
| 2,926,010 | 2/1960 | Kennaway et al. | 177—164 |
| 3,087,652 | 4/1963 | Smith | 222—55 |
| 3,092,072 | 6/1963 | Strimel | 116—129 |

FOREIGN PATENTS

| | | |
|---|---|---|
| 1,256,419 | 2/1961 | France. |
| 258,709 | 9/1926 | Great Britain. |

RICHARD B. WILKINSON, *Primary Examiner.*

LEO SMILOW, *Examiner.*

S. J. TOMSKY, *Assistant Examiner.*